(No Model.)  4 Sheets—Sheet 1.

W. B. ESPEUT.
APPARATUS FOR WINDING ARMATURES FOR DYNAMO ELECTRIC MACHINES.

No. 302,627. Patented July 29, 1884.

Witnesses:
E. A. Dick
J. Walter Blandford

Inventor:
William Bancroft Espeut
by Marcellus Bailey
his attorney

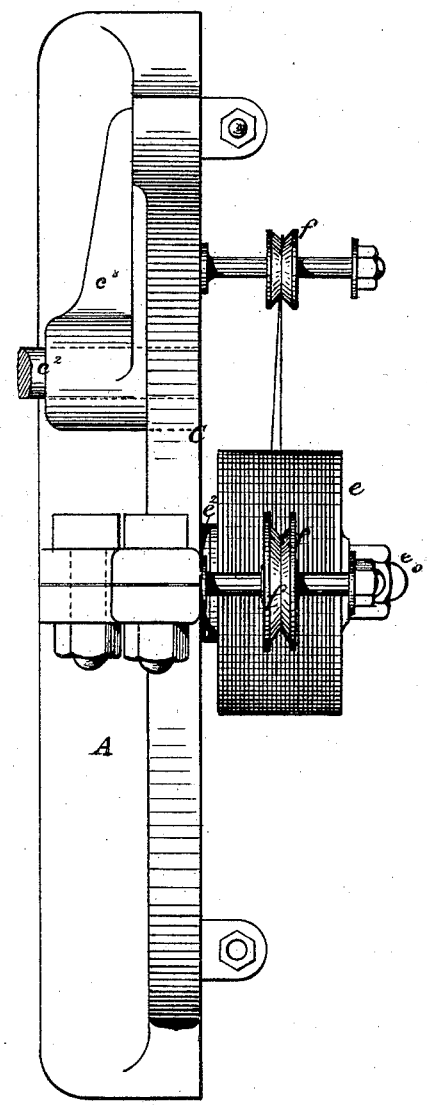

(No Model.)  
4 Sheets—Sheet 4.
W. B. ESPEUT.
APPARATUS FOR WINDING ARMATURES FOR DYNAMO ELECTRIC MACHINES.
No. 302,627. Patented July 29, 1884.
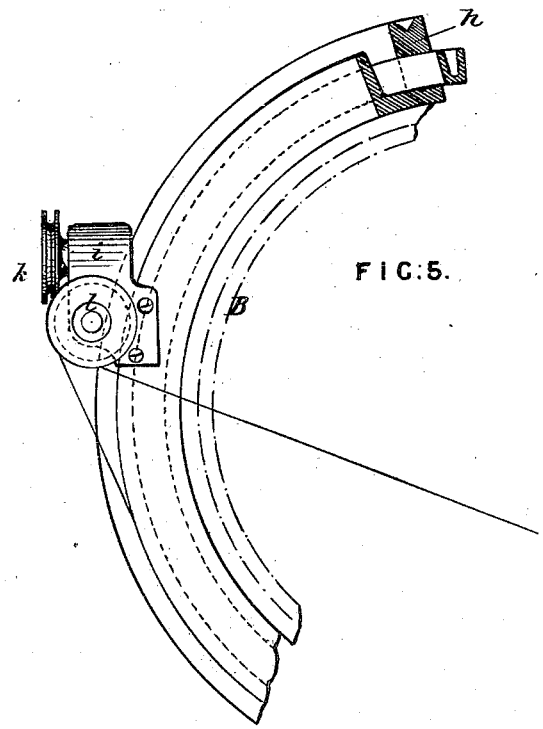
FIG. 5.
FIG. 6
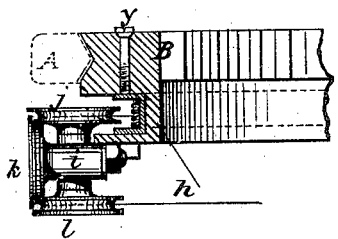
Witnesses:  
E. A. Dick  
J. Walter Blandford
Inventor:  
William Bancroft Espeut  
by Marcellus Bailey  
his attorney

UNITED STATES PATENT OFFICE.

W. BANCROFT ESPEUT, OF 14 SOUTHWICK STREET, HYDE PARK, COUNTY OF MIDDLESEX, ASSIGNOR TO WM. MUNTON BULLIVANT, OF 72 MARK LANE, LONDON, ENGLAND.

APPARATUS FOR WINDING ARMATURES FOR DYNAMO-ELECTRIC MACHINES.

SPECIFICATION forming part of Letters Patent No. 302,627, dated July 29, 1884.

Application filed December 2, 1882. (No model.) Patented in England August 23, 1882, No. 4,036.

*To all whom it may concern:*

Be it known that I, WILLIAM BANCROFT ESPEUT, a subject of the Queen of Great Britain, and residing at 14 Southwick street, Hyde Park, in the county of Middlesex, England, have invented Certain Apparatus for Winding Coils of Wire upon the Armatures of Dynamo-Electrical Machines, and for like purposes, (for which I have obtained a patent in Great Britain, No. 4,036, dated August 23, 1882,) of which the following is a specification.

My invention has for its principal object to effect by machinery or apparatus, as hereinafter described, the winding of coils of wire upon the armatures of dynamo-electrical machines, which operation has hitherto been mainly effected by hand. According to my said invention, there is provided an apparatus consisting of a reel or revolving winder or reel-carrier, which is supported and capable of having motion of rotation imparted to it in any convenient way. The said reel or winder in the case of winding upon an annular armature, for example, is split or hinged, or is provided with a gap, so that the armature to be wound can be engaged therewith, after the manner of the engaging of two links of a chain. The wire to be coiled upon the armature is wound upon the reel or winder, and its free end is passed out beneath or between or from off a friction device of any suitable kind, and is attached to the armature. On a motion of rotation being given to the reel winder or carrier, the said wire will be unwound from the reel and coiled upon the armature or other body in regularly-distributed laps.

In order that my said invention may be fully understood, I shall now proceed more particularly to describe the same, and for that purpose shall refer to the several figures on the annexed sheets of drawings, the same letters of reference indicating corresponding parts in all the figures.

Figure 1:
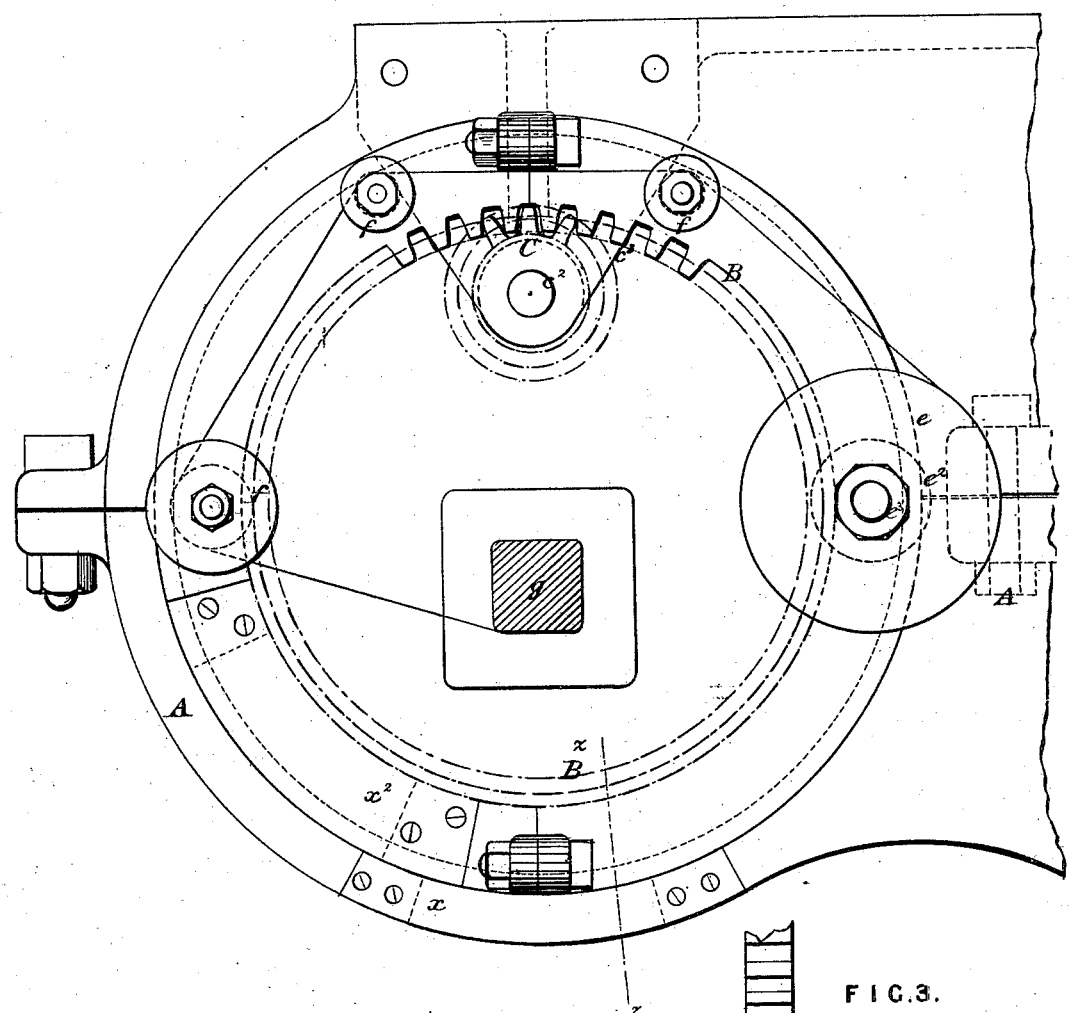
Figure 3:
Figure 4:
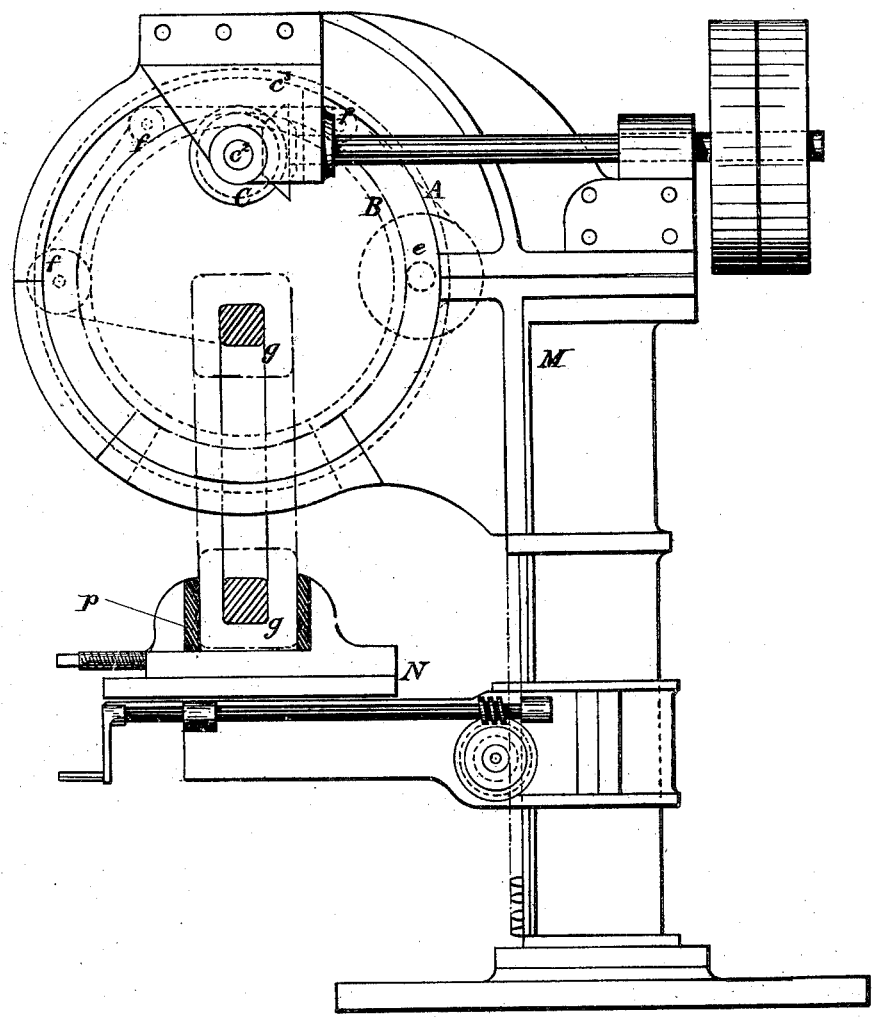

Figure 1 represents in side elevation, and Fig. 2 in plan, an apparatus constructed according to my invention. Fig. 3 is a section on the line Z Z, Fig. 1. Fig. 4 is an elevation of an apparatus embodying my invention, showing a method of applying power thereto and a support for an annular armature. Figs. 5 and 6 illustrate another form of my invention.

The bracket-piece A carries an internally-toothed ring, B, the seating of the outer side of the said ring upon the inner recess of the said bracket-piece being of a V or other form, to retain the said ring in position. A pinion, C, is carried upon a shaft, $c^2$, mounted in a bracket, $c^3$, on the part A. A reel, $e$, is mounted upon an axis carried by the ring B. A friction device is provided, which may conveniently consist of a disk of india-rubber, $e^2$, placed between the reel and the ring, (or between the nut $e^3$ and the reel,) and by means of the nut $e^3$ the frictional contact of the said reel can be adjusted to give a proper tension of the wire in winding. This reel $e$ carries the wire to be wound upon the armature or other body, the said wire being led over guide and tension pulleys $f$, which are mounted upon axes, also fixed to the ring B. These axes are preferably of sufficient length (as shown in Fig. 2) to admit of the pulleys following the movement of the wire as it is unwound from the reel. For winding an annular armature or the like, the bracket-piece A and the ring B are made in halves or in parts, or are provided with gaps for the insertion of the armature or the like. In the drawings the bracket-piece and ring each have a piece (at $x$ and $x^2$, respectively) cut out of them, the said pieces being carried by face-plates, or being provided with wings, which are bolted to the standard and ring respectively. By removing the bolts the parts $x\ x^2$ can be removed for the insertion of the armature or other article to be wound. The armature represented at $g$ is supported in any convenient manner.

Fig. 4 represents a convenient arrangement for the purpose of winding annular armatures. The bracket-piece A is carried at the upper part of the standard M, upon which is also carried an adjustable table, N, provided with clamps $p$, for holding the armature $g$ while being wound. The wire to be wound upon the said armature is led from the reel $e$ over the pulleys $ff$, and its end is connected to the armature. On rotating the ring B by means of the pinion C the wire is wound upon the armature or other body by being carried therearound as the said ring revolves.

Fig. 5 represents in elevation, and Fig. 6 in horizontal section, a portion of a modified form of machine wherein the wire, in place of being held upon a reel carried by an axis on the ring, is contained in an annular slipping carrier, $h$, carried in an annular recess formed in the ring B. The said ring has affixed thereto a bracket, $i$, in which turn the guide and tension-pulleys $j\ k\ l$, around which the wire is led from the carrier to the armature. A screw pin or pins, as at $y$, may be employed, by adjusting which the requisite friction may be put upon the slipping ring $h$. The article being wound may be fed forward, if desired, automatically, or by hand, as required, to receive the coils. In place of there being filling-pieces $x\ x^2$ for filling the gaps in the support and ring, these gaps may be left unfilled if found convenient.

Although I have described the apparatus as being used for winding wire upon circular armatures, yet I wish it to be understood that the machine may be employed for winding either circular armatures or armatures of other form, or for winding wire or other material upon other articles to which it is or may be applicable. For example, the machine may be used for winding induction-coils.

Having now described and particularly ascertained the nature of my said invention and the manner in which the same is or may be used or carried into effect, I would observe, in conclusion, that I wish it to be understood that I do not limit myself to the precise details hereinbefore described, and illustrated in the accompanying drawings, as the same may be varied without departing from the nature of my invention; but

What I consider to be novel and original, and therefore claim as the invention, is—

1. In the herein-described winding-machine, the combination of a supporting-bracket, an annular reel-carrier supported by and adapted to revolve within said bracket, and having an internal peripheral gear, a reel mounted on said carrier, and a gear-wheel supported by said bracket and engaging with the reel-carrier, substantially as hereinbefore set forth.

2. In the herein-described winding-machine, the combination of a supporting-bracket having a circular bearing and an aperture for the armature within said bearing, an annular reel mounted on said bearing and adapted to surround the part to be wound, and devices for guiding the wire from the reel to said part, substantially as set forth.

3. In the herein-described winding-machine, the combination of a supporting-bracket having a circular bearing and an aperture for the armature within said bearing, an annular reel mounted on said bearing, and adapted to surround the part to be wound, and the pulleys $j\ k\ l$, arranged as described, to guide the wire from the reel to said part, substantially as hereinbefore set forth.

4. In the herein-described winding-machine, the combination, with the supporting-frame and the winding devices, of a carriage adjustable on said frame toward or from the winding devices, and a second carriage adjustable longitudinally on the first carriage and carrying a clamp for the armature, substantially as hereinbefore set forth.

In testimony whereof I have signed my name to this specification in the presence of two subscribing witnesses.

W. BANCROFT ESPEUT.

Witnesses:
 CHAS. MILLS,
 CHAS. JAMES JONES.
*Both of 47 Lincoln's Inn Fields, London.*